United States Patent [19]
Willmann

[11] Patent Number: 5,746,389
[45] Date of Patent: May 5, 1998

[54] CABLE RETRACTOR

[75] Inventor: Donald F. Willmann, St. Petersburg, Fla.

[73] Assignee: E-Systems, Inc., Dallas, Tex.

[21] Appl. No.: 771,261

[22] Filed: Dec. 20, 1996

Related U.S. Application Data

[60] Provisional application No. 60/044,002 Dec.18, 1996.

[51] Int. Cl.$^6$ .............................. B65H 57/28; B65H 57/04
[52] U.S. Cl. ................... 242/615.1; 174/69; 242/675.3; 384/134
[58] Field of Search ........................ 242/675.1, 675.3; 385/134, 135; 174/69, DIG. 9; 248/49, 51

[56] References Cited

U.S. PATENT DOCUMENTS

| | | | |
|---|---|---|---|
| 2,864,907 | 12/1958 | Waninger | 191/12 |
| 2,902,535 | 9/1959 | Francis | 174/69 |
| 3,129,750 | 4/1964 | Davies | 174/69 |
| 3,284,036 | 11/1966 | Nansel | 248/49 |
| 3,459,880 | 8/1969 | Erdle | 174/69 X |
| 3,676,572 | 7/1972 | Davies | 174/69 |
| 3,848,361 | 11/1974 | Foster et al. | 174/69 X |
| 3,921,388 | 11/1975 | Loos et al. | 174/69 X |
| 4,614,383 | 9/1986 | Polley et al. | 312/273 |
| 4,672,805 | 6/1987 | Moritz | 59/78.1 |
| 4,840,023 | 6/1989 | Borsani | 59/78.1 |
| 4,932,744 | 6/1990 | Messelhi | 350/96.2 |
| 5,071,220 | 12/1991 | Ruello et al. | 385/135 |
| 5,093,887 | 3/1992 | Witte | 385/135 |
| 5,115,260 | 5/1992 | Hayward et al. | 385/100 |
| 5,142,606 | 8/1992 | Carney et al. | 385/134 |
| 5,149,017 | 9/1992 | McEntire et al. | 244/114 R |
| 5,212,882 | 5/1993 | Hamonko et al. | 29/749 |
| 5,220,779 | 6/1993 | Tatsuta et al. | 59/78.1 |
| 5,237,640 | 8/1993 | Pedraza et al. | 385/136 |
| 5,353,367 | 10/1994 | Czosnowski et al. | 385/135 |

Primary Examiner—William Stryjewski
Attorney, Agent, or Firm—Harold E. Meier

[57] ABSTRACT

A cable retractor comprising interconnected restrainer segments attached end-to-end by pivot pins, such that the entire structure is foldable into a small space. A fiber optic cable is attached to restrainer segments in a manner such that the total path length of the fiber optic cable does not substantially change as the retractor is unfolded to an extended position from a folded position.

14 Claims, 4 Drawing Sheets

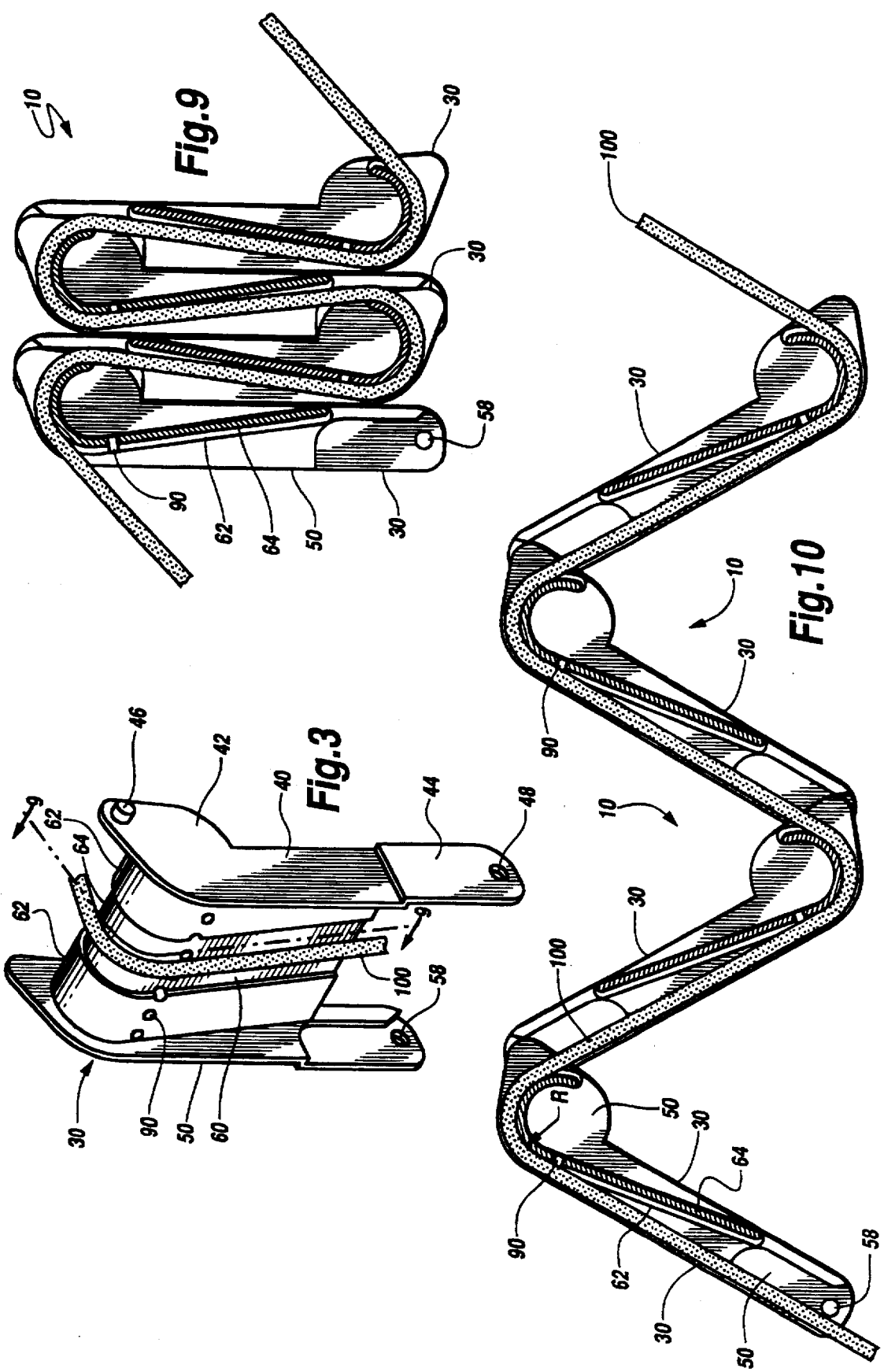

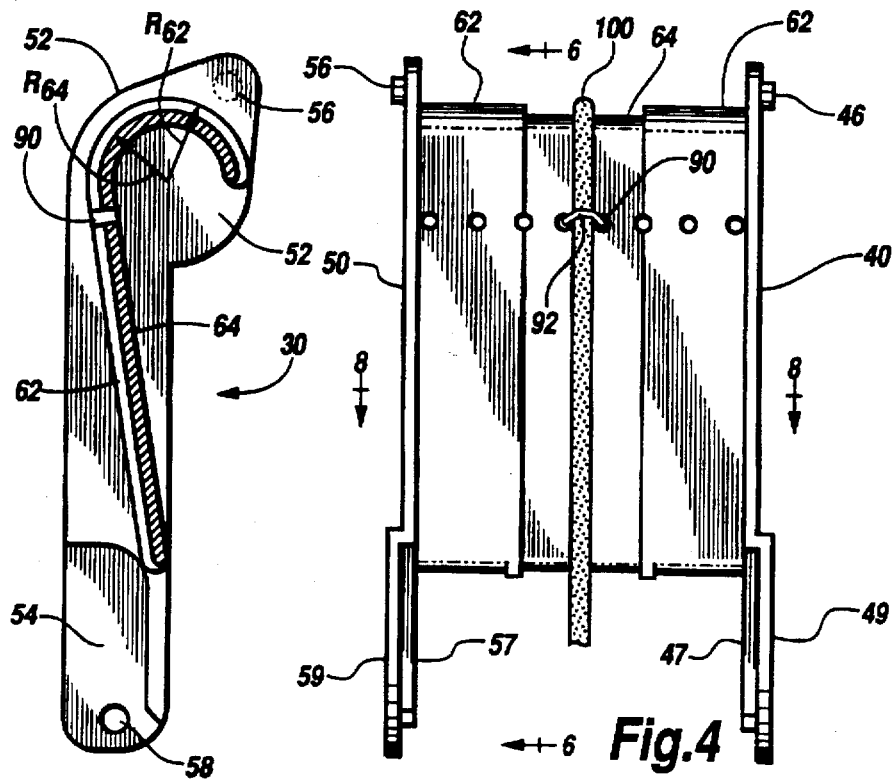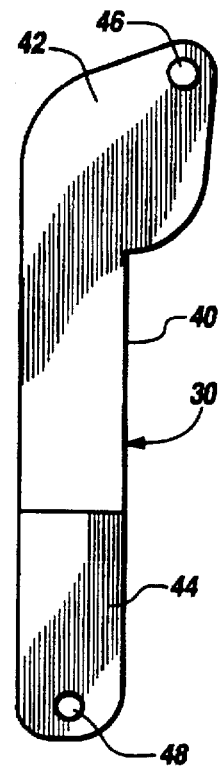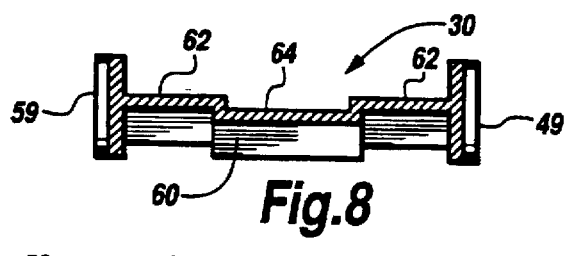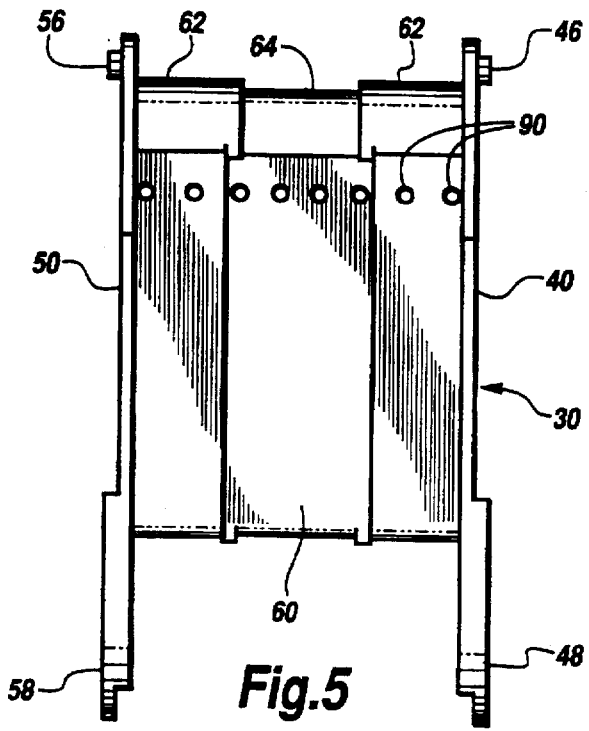

5,746,389

1

CABLE RETRACTOR

This application claims the benefit of a U.S. application Ser. No. 08/576,342, filed Dec. 21, 1995, which was converted to provisional application 60/044,002, by Petition to Convert Non-Provisional Application to a Provisional Application Pursuant to 37 C.F.R. §1.53(b) (2)(ii), on Dec. 18, 1996, now abandoned.

TECHNICAL FIELD

This invention relates to cable management and, more particularly, to an apparatus providing for a constant path length, preventing buckling for a fiber optic or electronic cable when the apparatus is folded from an extended position to a collapsed position.

BACKGROUND OF THE INVENTION

In the telecommunications field it is necessary to organize transmission cable in an efficient manner. Failure to efficiently manage cable routing may lead to excessive wear and premature failure. Special care must be taken with fiber optic cable to insure that a bend radius is kept above a certain minimum. If the radius is below the minimum required for the particular type of fiber optic cable, transmission may be impaired or the cable may kink or break.

Prior art devices such as those disclosed in U.S. Pat. Nos. 5,093,997 and 5,142,606 have concentrated on maintaining the cable above a minimum bend radius but have not successfully implemented a constant path length for expanding and contracting a cable holder.

SUMMARY OF THE INVENTION

The cable retractor of the present invention comprises a plurality of restrainer segments, typically of molded plastic, attached end-to-end by pivot pins, such that the entire cable retractor may be folded into a small space. A fiber optic cable is attached to the restrainer segments in a manner such that the total path length of the fiber optic cable does not substantially change as the retractor is unfolded to an extended position from a folded position.

Each rigid restrainer segment includes a right end plate and a complementary left end plate connected by a web. The end plates each have an interior side disposed toward the web and an exterior section disposed away from the web and a generally rectangular shape with a head end and a tail end.

The web has a longitudinal cross section with a straight section integral with an arcuate section. The web is disposed between the end plates with the arcuate section adjacent to the head section of each end plate. The radius of curvature of the arcuate section is equal to or greater than the minimum permissible bend radius of a cable.

The cable rests longitudinally on the web and a plurality of openings in the web receive conventional cable ties to secure the cable to the web. Restrainer segments are interconnected head to tail by means of pivot pins.

BRIEF DESCRIPTION OF THE DRAWINGS

A more complete understanding of the present invention may be had by reference to the following Detailed Description when taken in conjunction with the accompanying drawings wherein.

2

Figure 2:
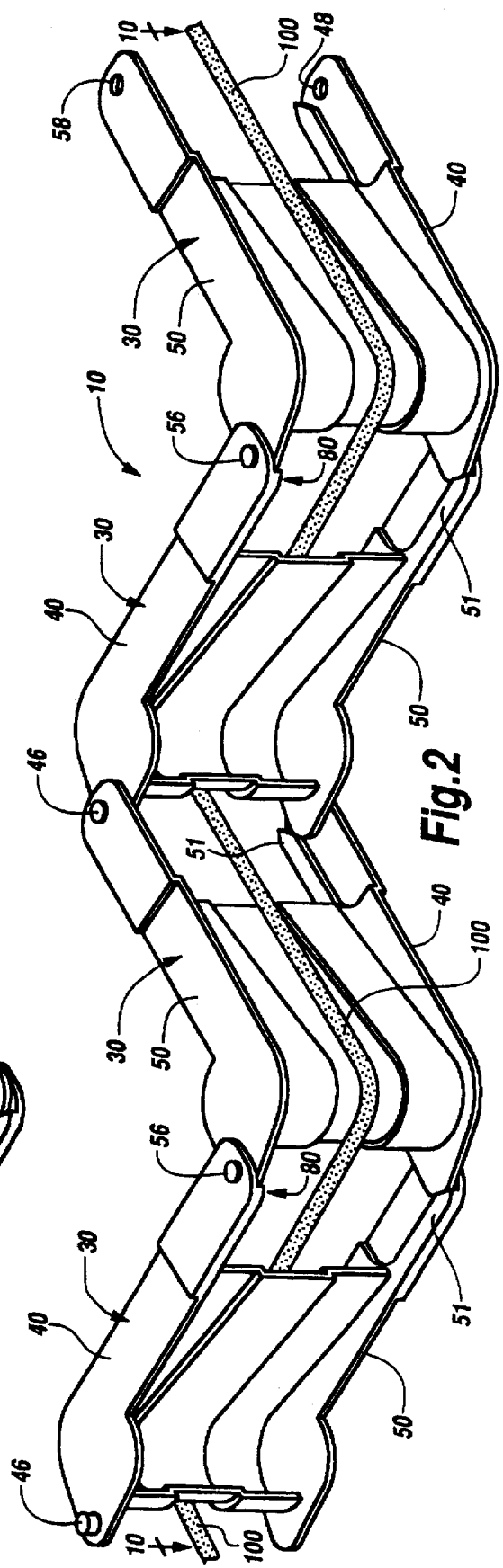
FIG. 2 is a perspective view of the cable retractor in an extended position.
Figure 11:
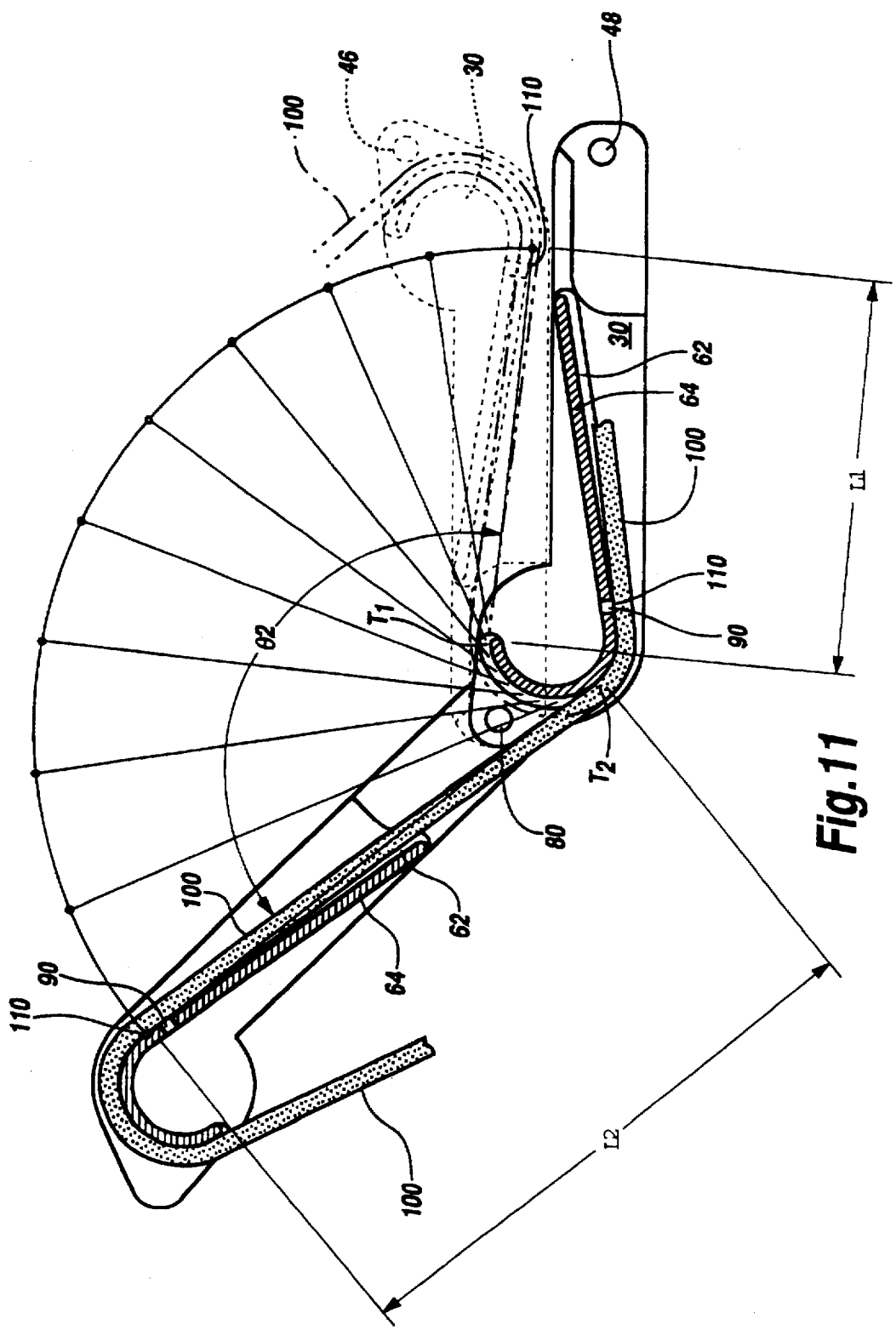

FIG. 3 is a perspective view of a restrainer element of the cable retractor;

FIG. 4 is a front view of the restrainer;

FIG. 5 is a back view of the restrainer;

FIG. 6 is an end view illustrating a longitudinal cross section of the restrainer taken at section 6—6 in FIG. 4;

FIG. 7 is an end view of the restrainer illustrating an end plate of the restrainer;

FIG. 8 is a top view illustrating a lateral cross section of the restrainer taken at section 8—8 of FIG. 4;

FIG. 9 is a side view illustrating a longitudinal cross section of the cable retractor in a folded position taken at section 9—9 of FIG. 3;

FIG. 10 is a side view illustrating a longitudinal cross section of the cable retractor in an expanded position taken at section 10—10 of FIG. 2; and FIG. 11 is a front view illustrating the rotation of a second restrainer segment with respect to a first restrainer segment.

DETAILED DESCRIPTION OF THE INVENTION

Figure 1:
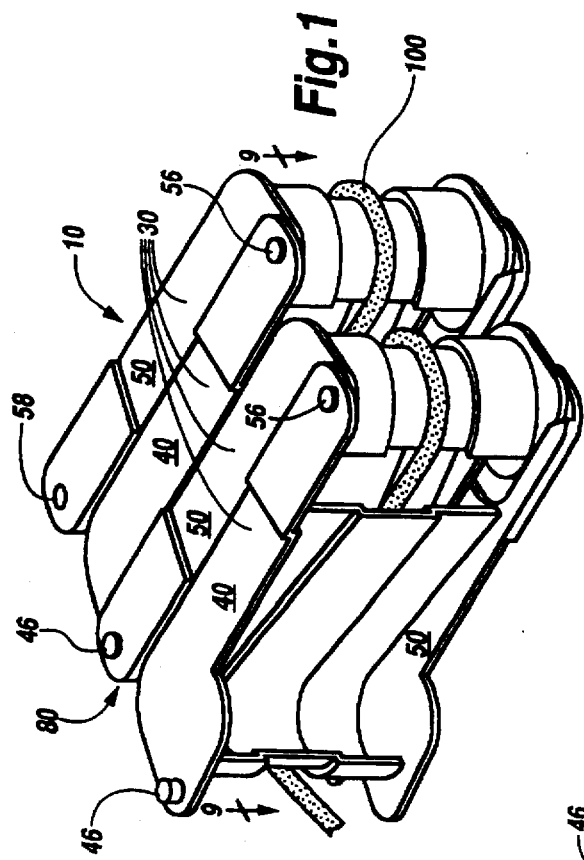
FIG. 1 is a perspective view illustrating a cable retractor in a collapsed position.

Reference is now made to the Drawings wherein like reference characters denote like or similar parts throughout the eleven figures. Referring to FIGS. 1 and 2, the cable retractor 10 ("retractor") of the present invention comprises four rigid restrainer segments 30, preferably of molded plastic, attached end-to-end by pivot pins 46 and 56 such that the entire cable retractor may be folded into a small space. The fiber optic cable 100 is fixed to the restrainer segments 30 and strung around the restrainer segments 30 in such a manner that the total path length for the fiber optic cable 100 ("cable") is not changed as the retractor is folded and unfolded.

Referring to FIG. 3, therein is shown a perspective view of a restrainer segment 30 having a right end plate 40 and a complimentary left end plate 50. Between the end plates 40 and 50 is a web 60. FIGS. 3 and 7 illustrate the right end plate 40 as having a generally rectangular shape with a head end 42 and a tail end 44. An opening 48 is located in tail end 44 to receive a pivot pin, as will be explained. The head end 42 has a generally rounded configuration having a radius of curvature greater than the minimum bend radius of a cable 100 attached to the retractor. The right end plate 40 has an interior side disposed toward the web 60 and an exterior side disposed away from the web 60. A pivot pin 46 is affixed to the exterior side of right end plate 40 at the head end 42.

Referring to FIGS. 4 and 5, the tail end 44 has a thicker cross section 49 to accommodate a recess 47 on the interior side. The recess 47 is sized to receive the head section of an adjacent restrainer segment 30. As illustrated in FIGS. 3–6, the complimentary left end plate 50 incorporates a head end 52 having a pivot pin 56 attached thereto, a tail end 54 having an opening 58 and a thicker cross section 59 with a recess 57. Each part of the left end plate 50 is located in a position corresponding to those previously described for the corresponding part of right end plate 40.

Referring to FIGS. 3–5, the web 60 is disposed between end plates 40 and 50 and includes openings 90 (See FIG. 4) for use in conjunction with conventional plastic cable ties 92 to secure the cable 100 to a restrainer segment 30. As illustrated in FIG. 8, the web 60 has a first web section 62 and a stepped down second web section 64. As illustrated in FIG. 6, web sections 62 and 64 have longitudinal cross sections shaped like a candy cane; i.e., having a lower straight portion and an arcuate upper portion. The radius of curvature "R" of the arcuate portion is determined by the minimum bend radius of the cable 100. The minimum bend radius of a cable is a function of the diameter of the cable and of the material from which the cable is formed. For fiber optic cable, a minimum bend radius less than 1 inch is not recommended. The radius of curvature "$R_{64}$" of the arcuate portion of web section 64 is slightly smaller than the radius of curvature "$R_{62}$" for web section 62. The difference in the radius of curvature provides a constant cable retractor mean bend radius allowing the retractor to function for cable of differing diameters. The web 60 may have a continuous cross section with one radius of curvature or multiple cross sections, each with a different radius of curvature in order to allow concurrent use of the retractor for multiple cables of differing diameters.

Turning now to FIGS. 9 and 10, wherein is illustrated a side cross section of a series of four interconnected restrainer segments 30 forming a cable retractor 10. FIG. 10 illustrates the cable retractor 10 in an expanded position and FIG. 9 illustrates the cable retractor 10 in a folded position. Restrainer segments 30 are interconnected head to tail by means of the pivot pins 46 and 56. Referring to FIGS. 1 and 2 pivot pins 46 and 56 located at the head end 42 and 52 of plates 40 and 50 respectively, of the first restrainer segment are inserted into openings 48 and 58 located in the tail end 44 and 54 of the second restrainer segment 30. The head of the second restrainer segment 30 is connected to the tail of the third segment and the head of the third segment is connected to the tail of the fourth segment all in a similar manner. In the preferred embodiment, pivot pins 46 and 56 are molded integrally with end plates 40 and 50; however, alternatively, openings and conventional fasteners may be used as a method of connection.

As illustrated in FIG. 4, the cable 100 is fixed to the web 60 by the cable tie 92 and passes along the web around the curved portion of the web and onto the web of the second restrainer segment 30 and so on to the third and fourth restrainer segments. The path length for the cable 100 does not expand or contract as the retractor 10 is lengthened or shortened.

Turning to FIG. 11, the cable retractor 10 provides a rolling action similar to the action of the involute curve of a gear tooth. This action is a smooth, continuous, rolling action with a minimum of slippage between the cable 100 and the cable retractor 10. The positional relationship of pivot point 80 and $R_{64}$ (shown in FIG. 6) results in providing this action. Each restrainer segment 30 is connected to an adjacent, substantially identical restrainer segment 30 at pivot point 80. Phantom lines illustrate the smooth continuous movement of adjacent restrainer segments 30. Cable 100 is fixed to the restrainer segments 30 at fixed points 110 by conventional cable ties 92 passing through openings 90 (see FIG. 4). The Greek letter THETA "θ" used in FIG. 11 represents the angular arc created as a restrainer segment 30 unfolds with respect to an adjacent restrainer segment 30. The distance "$L_1$" represents the length of cable 100 between the fixed point 110 on web 60 of a restrainer segment 30 and the tangent point ("$T_1$") where the cable touches the web 60 on an adjacent restrainer segment 30 when the retractor 10 is in a folded position. "L" changes by the relationship $L_2=L_1+2\pi\times$(mean cable bend radius) $\times(\theta/360)$. The distance $L_2$ is the tangential ("$T_2$") length of the cable at angle θ as the retractor is expanded. Optimally, cable retractor 100 is not expanded to a θ angle over 120 degrees. Stop point 51 (shown in FIG. 2) prevents over expansion. When the cable retractor is fully retracted, θ is 0, therefore $L_1=L_2$.

Although a preferred embodiment of the invention has been illustrated in the accompanying Drawings and described in the foregoing Detailed Description, it will be understood that the invention is not limited to the embodiment disclosed but is capable of numerous modifications without departing from the scope of the invention as claimed.

I claim:

1. A rolling action, bi-directional foldable cable retractor for supporting a cable above a minimum bend radius as the cable retractor bi-directionally folds and unfolds, said cable retractor comprising:

at least two restrainer segments each having a forward orientation and a back orientation, said restrainer segments interconnected with the forward orientation and backward orientation alternating to enable bi-directional folding of the cable to weave between the interconnected restrainer segments, each restraining segment comprising:

a right end plate having a longitudinal axis and a head end and a tail end, the head end offset from the longitudinal axis;

a complimentary left end plate having a longitudinal axis and a head end and a tail end, the head end offset from the longitudinal axis;

a web having a longitudinal cross section including a substantially linear portion integral with an arcuate portion, the arcuate portion having a radius of curvature equal to or greater than the minimum bend radius of the cable engaging said web, said web attached on one side to the right end plate and on the opposite side to the complimentary left end plate with the arcuate portion at the head end of each end plate;

pivot means at the head end of each end plate, said pivot means displaced from the longitudinal axis of the end plate; and pivot means in the tail end of each end plate for coupling with the pivot means at the head end of the adjacent restrainer segment, whereby the position in the pivot means in the head end and the pivot means in the tail end enable a rolling bi-directional foldable action between adjacent interconnected restrainer segments.

2. The rolling action, bi-directional foldable cable retractor of claim 1 wherein the end plates further include a wider cross section in the tail end sufficient to accommodate a corresponding recess in an interior side of the end plate, said recess sized to receive the head end of the adjacent restrainer segment.

3. The rolling action, bi-directional foldable cable retractor as in claim 1 including means for securing the cable to the web.

4. The rolling action, bi-directional foldable cable retractor of claim 1 including means for securing the cable to the web comprising a plurality of openings in the web for receiving conventional cable ties.

5. The rolling action, bi-directional foldable cable retractor of claim 1 wherein the pivot means for connecting the head end of a restrainer segment to the tail end of an adjacent restrainer segment comprises:

a pivot pin affixed to the head end of each end plate; and an opening in the tail end of each end plate for receiving the pivot pin of the adjacent restrainer segment.

6. The rolling action, bi-directional foldable cable retractor as in claim 1 including a stop point on each tail end to limit over expansion between adjoining restrainer segments.

7. The rolling action, bi-directional foldable cable retractor, as set forth in claim 6 wherein the radius of curvature of each arcuate portion of said web varies as a function of the diameter of the cable attached to the retractor and the cable material.

8. The rolling action, bi-directional foldable cable retractor as set forth in claim 6, wherein said stop point positioned on each tail end limits expansion of the cable retractor to not more than 120 degrees.

9. The rolling action, bi-directional foldable cable retractor as in claim 1 wherein said web includes a plurality of longitudinal cross sections where the arcuate portion of each cross section has a radius of curvature selected to allow concurrent use of the retractor for multiple cables of differing diameters.

10. A rolling action, bi-directional foldable cable retractor for supporting a cable above a minimum bend radius as the cable retractor bi-directional folds and unfolds, said cable retractor comprising:

at least two substantially similar restrainer segments having alternating orientations attached end-to-end by pivot pins wherein each restrainer segment includes:
　　a right end plate having a longitudinal axis and a head end and a tail end, the head end offset from the longitudinal axis;
　　a complimentary left end plate having a longitudinal axis and a head end and a tail end, the head end offset from the longitudinal axis;
　　a web section having a longitudinal cross section including a substantially linear portion integral with an arcuate portion, the arcuate portion having a radius of curvature equal to or greater than the minimum bend radius of the cable engaging the web section, said web section attached to the right end plate and to the complimentary left end plate with the arcuate portion of said web section at the head end of each end plate;
　　each end plate having an interior side disposed toward the web section and an exterior side disposed away from the web section;
　　a recess on the interior side of each tail end of an end plate, said recess sized to receive the head end of the adjacent restrainer segment; and
　　a pivot pin affixed to the exterior side of the head end of each end plate displaced from the longitudinal axis of the end plate, and an opening in the tail end of each end plate substantially along the longitudinal axis of the end plate for receiving the pivot pin at the head end of the adjacent restrainer segment, whereby the position of the pivot pin in the head end and the opening in the tail end enable a rolling, bi-directional foldable action between adjacent interconnected restraining segments.

11. The rolling action, bi-directional foldable cable retractor as in claim 10 including a stop point on each tail end to limit over expansion between adjoining restraining segments.

12. The rolling action, bi-directional foldable cable retractor as set forth in claim 11, wherein said stop point positioned on each tail end limits expansion of the cable retractor to not more than 120 degrees.

13. The rolling action, bi-directional foldable cable retractor as in claim 10 wherein said web includes a plurality of longitudinal cross sections where the arcuate portion of each cross section has a radius of curvature selected to allow concurrent use of the retractor for multiple cables of differing diameters.

14. The rolling action, bi-directional foldable cable retractor as in claim 10 including means for securing the cable to the web.

* * * * *

UNITED STATES PATENT AND TRADEMARK OFFICE
CERTIFICATE OF CORRECTION

PATENT NO.        : 5,746,389                                        Page 1 of 1
APPLICATION NO. : 08/771261
DATED             : May 5, 1998
INVENTOR(S)       : Donald F. Willmann It is certified that error appears in the above-identified patent and that said Letters Patent is hereby corrected as shown below:

Column 1:
Before the "TECHNICAL FIELD" section, at Line 10 insert:

-- GOVERNMENT INTEREST
    This invention was made with Government support under contract number N00025-92-C-05230 awarded by the Naval Sea System Command. The Government has certain rights in this invention. --.

Signed and Sealed this

Twenty-second Day of May, 2007

JON W. DUDAS
*Director of the United States Patent and Trademark Office*